US006697175B1

United States Patent
Kumagai et al.

(10) Patent No.: US 6,697,175 B1
(45) Date of Patent: Feb. 24, 2004

(54) IMAGE READING APPARATUS AND SCANNER USING PHOTOELECTRIC CONVERSION UNIT WITH LIMITED PIXEL COUNT TO READ IMAGES WITH HIGH RESOLUTION AND METHOD THEREOF

(75) Inventors: Makoto Kumagai, Toyokawa (JP);
Takayuki Nabeshima, Toyokawa (JP);
Satoshi Iwasaki, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/409,467

(22) Filed: Sep. 30, 1999

(30) Foreign Application Priority Data

Oct. 5, 1998 (JP) ............................................ 10-282575

(51) Int. Cl.⁷ ................................................ H04N 1/04
(52) U.S. Cl. ..................... 358/497; 358/497; 358/488; 358/486; 358/474; 358/483; 250/235; 250/234; 250/236; 250/208.1
(58) Field of Search ............................... 358/497, 488, 358/486, 474, 483; 250/235, 234, 236, 208.1

(56) References Cited

U.S. PATENT DOCUMENTS 5,767,987 A 6/1998 Wolff et al. ................. 358/447
5,786,901 A * 7/1998 Okada et al. ............... 250/234

6,320,680 B1 * 11/2001 Rhoads ....................... 358/483

FOREIGN PATENT DOCUMENTS

JP 7-58943 3/1995
JP 10-215370 8/1998

* cited by examiner

Primary Examiner—Edward Coles
Assistant Examiner—Heather D. Gibbs
(74) Attorney, Agent, or Firm—Sidley Austin Brown & Wood LLP

(57) ABSTRACT

To read an image with high resolution via a CCD linear sensor having a limited pixel count, an image reading apparatus includes: a CCD linear sensor having arranged in a main-scanning direction photoelectric conversion elements for receiving a light reflected from an original; a piezoelectric element for providing a relative displacement between a light receiving surface of the CCD linear sensor and an object's image formed on the light receiving surface, according to a predetermined oscillation function and in the main-scanning direction; and a sensor drive circuit timing the CCD linear sensor's charge accumulation. The sensor drive circuit uses a distance from a center of an amplitude of the relative displacement to the CCD linear sensor and a time period of charge accumulation by the CCD linear sensor to determine a time point to start charge accumulation. The apparatus also includes a signal synthesizing circuit using image signals output from the CCD linear sensor during one period of the predetermined oscillation function to reconstruct an image signal of one line.

10 Claims, 11 Drawing Sheets

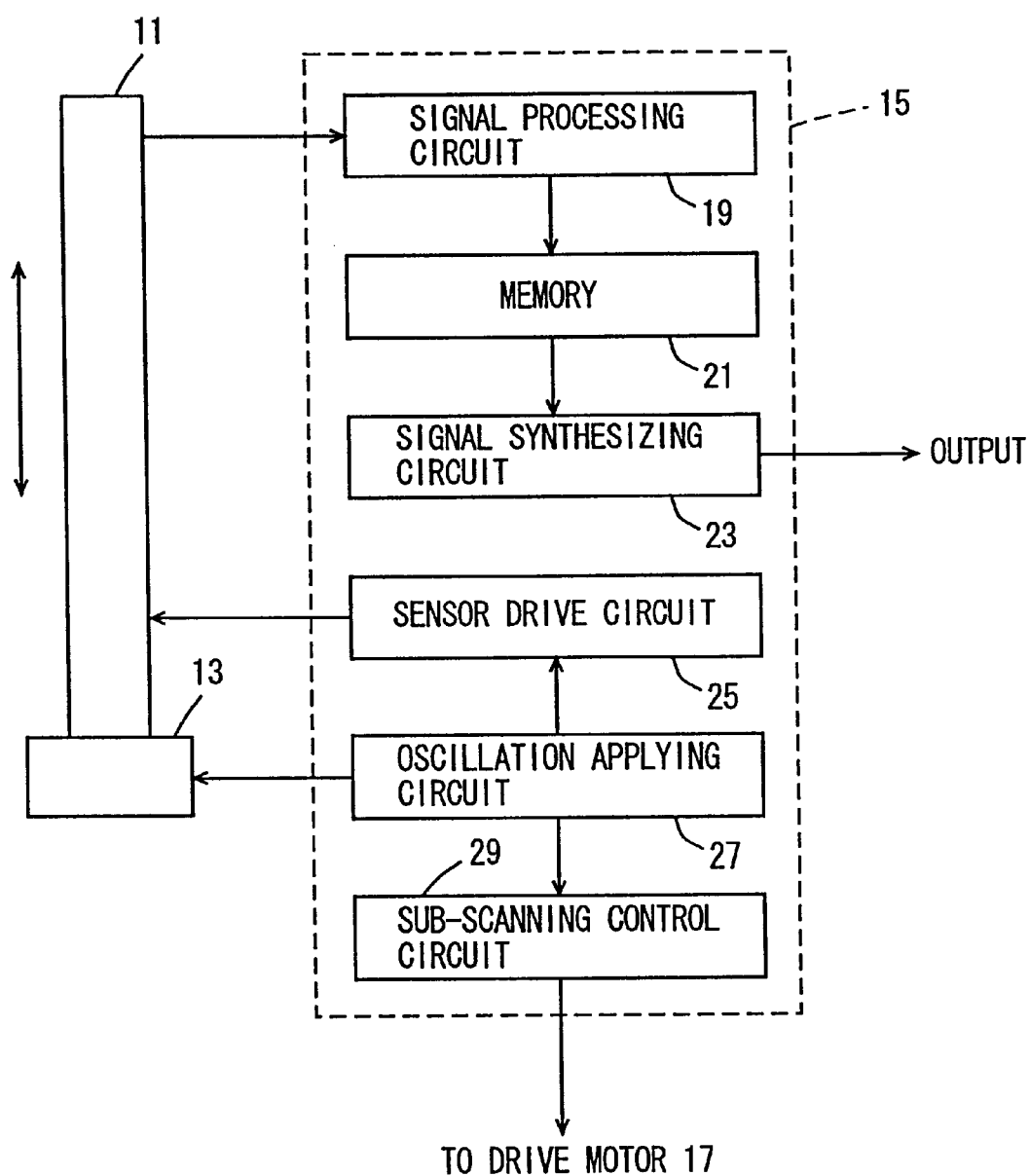

$0 \leq t < 2\pi$

| DIVIDER VALUE N | BARYCENTER | TIME POINT TO START ts | TIME POINT TO END te | AMPLITUDE A |
|---|---|---|---|---|
| 2 | G1 | 0 | $\pi$ | $\frac{1}{4}D$ |
| | G2 | $\pi$ | $2\pi$ | |
| 3 | G1 | $\frac{1}{6}\pi$ | $\frac{1}{2}\pi$ | $\frac{2}{3}D$ |
| | G2 | $0.975\pi$ | $1.025\pi$ | |
| | G3 | $\frac{3}{2}\pi$ | $\frac{5}{3}\pi$ | |

\*BARYCENTERS FOR DIVIDER VALUE OF 2 ARE G1, G2 OF Fig. 1(B).
BARYCENTERS FOR DIVIDER VALUE OF 3 ARE G1, G2, G3 OF FIG. 5(C).

IMAGE READING APPARATUS AND SCANNER USING PHOTOELECTRIC CONVERSION UNIT WITH LIMITED PIXEL COUNT TO READ IMAGES WITH HIGH RESOLUTION AND METHOD THEREOF

This application is based on application No. 10-282575 filed in Japan, the contents of which are hereby incorporated by reference.

BACKGROUND OF THE INVENTION

1. Field of the Invention

The present invention relates to image reading apparatuses, scanners, such as copiers, printers, facsimile, combinations thereof, microfilm readers, and image reading methods applied to such apparatuses and scanners. In particular, the present invention relates to apparatuses and scanners using a photoelectric conversion unit with limited pixel count to read images with high resolution, and image reading methods thereof.

2. Description of the Related Art

Conventionally an image reading apparatus has been known which employs a CCD linear sensor as an imaging device. Referring to FIG. 13, the conventional image reading apparatus is comprised of an automatic document feeder (ADF) 1 feeding a plurality of set original sheets onto a platen 3 one by one, a lamp 5 illuminating with light an original placed on platen 3, mirrors 7a–7c for directing a light reflected from the original to a lens 9, lens 9 for focusing the reflected light on a CCD linear sensor 11, and CCD linear sensor 11 for receiving and converting the reflected light into an electrical signal. CCD linear sensor 11 has photoelectric conversion elements arranged in a main-scanning direction (a direction perpendicular to the plane of the figure) and transmits to a control unit 80 the information of one line of the original as an image signal. Lamp 5 and mirror 7a are supported by a movable portion 6. Mirrors 7b and 7c are supported by a movable portion 8. Lens 9 is supported by a fixed portion 10. Movable portion 6 is moved by a dive motor 17 in a sub-scanning direction (a lateral direction in the figure). As movable portion 6 moves in the sub-scanning direction, that portion of the original which is illuminated by lamp 5 varies. Thus, the original can be scanned by CCD linear sensor 11 in the sub-scanning direction. Movable portions 6 and 8 are also moved by drive motor 17 parallel to the sub-scanning direction to provide a constant distance traveled by the lamp 5 light from the light's reflection at the original to the light's arrival at CCD linear sensor 11.

Thus the conventional image reading apparatus uses dive motor 17 to move movable portion 6 in the sub-scanning direction to allow CCD linear sensor 11 to load an image for each line successively.

In the image reading apparatus, however, CCD linear sensor 11 has a fixed number of photoelectric conversion elements (pixels) arranged in the main-scanning direction and the resolution of loaded image data in the main-scanning direction thus depends on the pixel count of CCD linear sensor 11 and thus has a fixed value. Thus, in the conventional image reading apparatus, the resolution in the main-scanning direction depends on the performance of CCD linear sensor 11 and can thus not be improved.

SUMMARY OF THE INVENTION

The present invention has been made to overcome the disadvantage described above.

One object of the present invention is to provide an image reading apparatus and scanner capable of reading images with high resolution via a photoelectric conversion unit with limited pixel count, and an image reading method thereof.

To achieve the above object, the present invention in one aspect provides an image reading apparatus including a photoelectric conversion unit having photoelectric conversion elements arranged in a main-scanning direction for receiving a light reflected from an original, a unit for providing a relative displacement in the main-scanning direction between a light receiving surface of the photoelectric conversion unit and an object's image formed on the light receiving surface of the photoelectric conversion unit, and a control unit disposed to time charge accumulation in the photoelectric conversion unit, wherein the unit providing a relative displacement provides the displacement according to a predetermined oscillation function and the control unit uses a distance from a center of an amplitude of the relative displacement to the photoelectric conversion unit and a time period of charge accumulation by the photoelectric conversion unit to determine a time point to start charge accumulation.

The present invention in another aspect provides a scanner including a photoelectric conversion unit having a plurality of photoelectric conversion elements arranged in a predetermined direction, an optical system focusing a light reflected from an original onto the receiving surface of the photoelectric conversion unit, and a drive unit providing a relative positional displacement in a predetermined direction between the photoelectric conversion unit and an image formed on the light receiving surface of the photoelectric conversion unit via the optical system.

The present invention in still another aspect provides an image reading method of focusing a light reflected from an original on a light receiving surface of a photoelectric conversion unit having a plurality of photoelectric conversion elements arranged in a first direction, and moving the formed image and the light receiving surface relative to each other in a second direction crossing the first direction while reading an image of the original, including the steps of providing a relative positional displacement in the first direction between the photoelectric conversion unit and the image formed on the light receiving surface of the photoelectric conversion unit via an optical system, and allowing the photoelectric conversion unit to perform charge accumulation at its displaced position and output an image signal.

Thus, the present invention can provide an image reading apparatus, scanner and image reading method capable of reading images with high resolution via a photoelectric conversion unit with limited pixel count.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a block diagram showing a schematic configuration of a control unit of an image reading apparatus.

DESCRIPTION OF THE PREFERRED EMBODIMENTS

Figure 1:
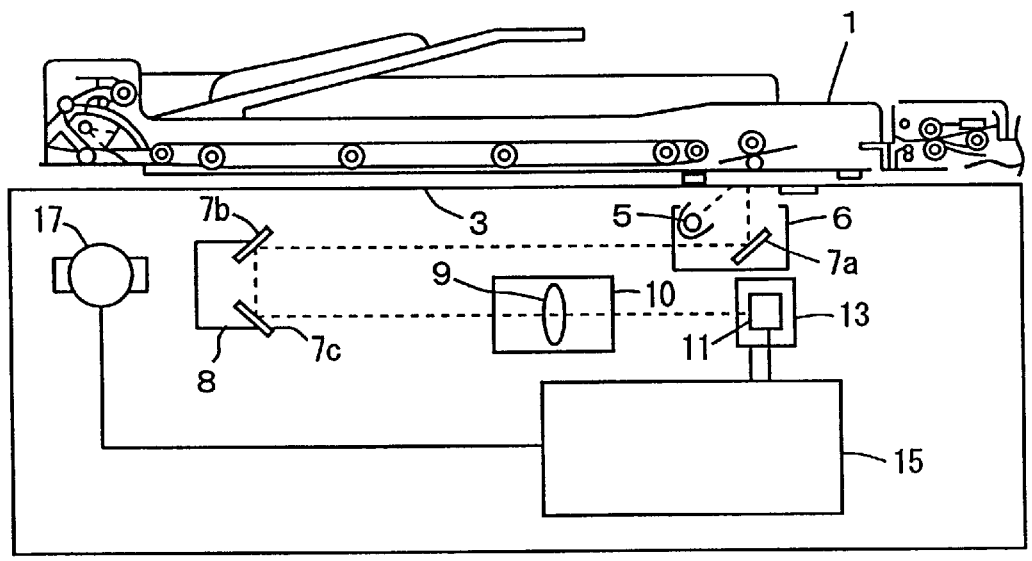
FIG. 1 is a cross section of the entire configuration of an image reading apparatus according to one embodiment of the present invention.

The embodiments of the present invention will now be described with reference to the drawings. In FIG. 1, the components identical to those shown in the FIG. 13 related art described above are denoted by same reference characters and a description thereof will not be repeated. CCD linear sensor 11 is supported by a piezoelectric element 13 which responds to a signal from control unit 15 by oscillating in a main-scanning direction (a direction perpendicular to the plane of the figure). According to the oscillation of piezoelectric element 13, CCD linear sensor 11 oscillates in the main-scanning direction. Control unit 15 controls the oscillation of piezoelectric element 13 and also transmits a transfer pulse and a driver pulse to CCD linear sensor 11 to control CCD linear sensor 11. Control unit 15 also receives and synthesizes an image signal output from CCD linear sensor 11. It also controls a drive motor 17 to control the scanning rate in a sub-scanning direction (a lateral direction in the figure).

Referring to FIG. 2, CCD linear sensor 11 and piezoelectric element 13 are controlled by control unit 15. Control unit 15 includes a signal processing circuit 19 which receives and processes an image signal output from CCD linear sensor 11, a memory 21 which stores the image signal processed in signal processing circuit 19, a signal synthesizing circuit 23 which synthesizes the image signal stored in memory 21 and output the synthesized signal, a sensor drive circuit 25 which controls CCD linear sensor 11, an oscillation applying circuit 27 which controls piezoelectric element 13, and a sub-scanning control circuit which controls drive motor 17.

Oscillation applying circuit 27 applies a voltage to piezoelectric element 13 according to a predetermined oscillation function (a sinusoidal function) to oscillate CCD linear sensor 11 in the main scanning direction (in the figure, the direction indicated by the arrow) in accordance with the predetermined oscillation function. Oscillation applying circuit 27 can obtain the position of CCD linear sensor 11 from the voltage applied to piezoelectric element 13 and accordingly transmits a signal indicative of the sensor's position to sensor driver circuit 25 and sub-scanning control circuit 29. While the oscillation applying circuit 27 of the present embodiment oscillates CCD linear sensor 11 according to a sine wave, oscillation applying circuit 27 may oscillates sensor 11 according to other waves, such as a triangular wave, a rectangular wave and the like.

In response to the signal indicative of the sensor's position sent from oscillation applying circuit 27, sub-scanning control circuit 29 controls drive motor 17 so that one line is main-scanned in one oscillation period of CCD linear sensor 11 according to a predetermined periodic function. By controlling drive motor 17, movable portions 6 and 8 are each moved at a predetermined rate.

In response to the signal indicative of the sensor's position sent from oscillation applying circuit 27, sensor drive circuit 25 controls CCD linear sensor 11 to an image signal multiple times in one oscillation period of CCD linear sensor 11 according to the predetermined oscillation function.

Figure 3:
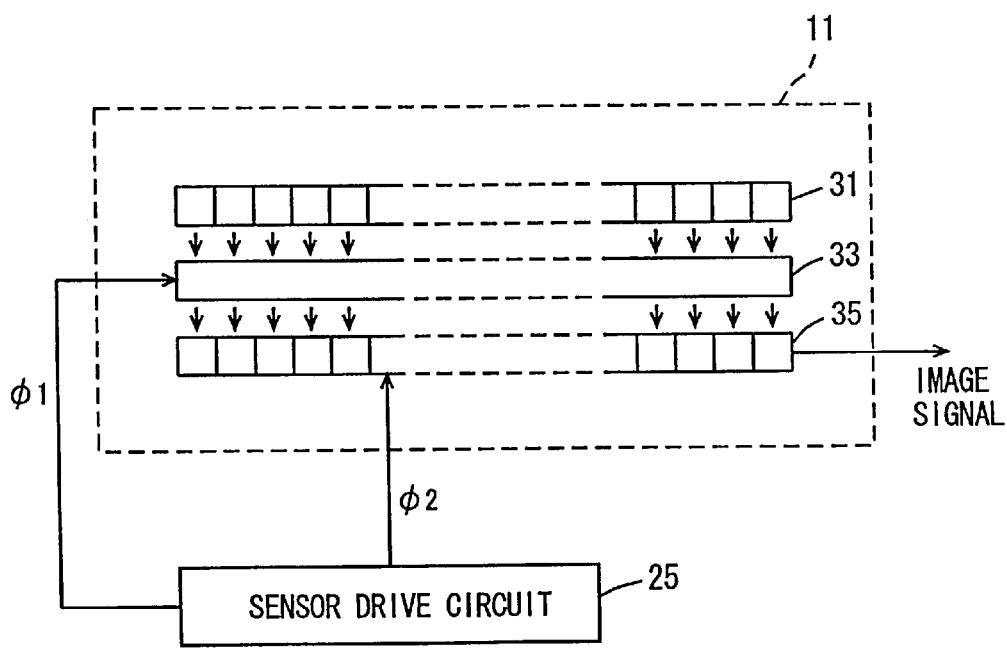
FIG. 3 shows input and output of signals to and from a CCD linear sensor.

Description will now be made of driving and controlling CCD linear sensor 11. Referring to FIG. 3, CCD linear sensor 11 includes a photodiode 31, a transfer gate 33 and a shift register 35. Photodiodes 31 are arranged in one line. When sensor drive circuit 25 transmits a transfer pulse $\Phi_1$ to transfer gate 33, a charge signal stored in photodiode 31 is transferred to shift register 35. When sensor dive circuit 25 transmits a drive pulse $\Phi_2$ to shift register 35, the charge signal is output as an image signal successively. Thus, transfer pulse $\Phi_1$ can control a time period during which electric charge is accumulated in photodiode 31, and a time point to start charge accumulation, and drive pulse $\Phi_2$ can determine the rate at which a charge signal is output.

Referring again to FIG. 2, the image signal output from CCD linear sensor 11 is received by signal processing circuit 19 and subjected to analog processing, such as sample and hold, multiplication, and the like, and thereafter quantized and stored in memory 21. Signal synthesizing circuit 23 reads the image signal stored in the memory and uses it in the synthesis to provide an image signal for one line and outputs it. It should be noted that an image signal for one line corresponds to image signals output from CCD linear sensor 11 during one oscillation period of CCD linear sensor 11 according to a predetermined operation function. The frequency at which CCD linear sensor 11 outputs image signals for one period is determined by sensor dive circuit 25.

Figure 4:
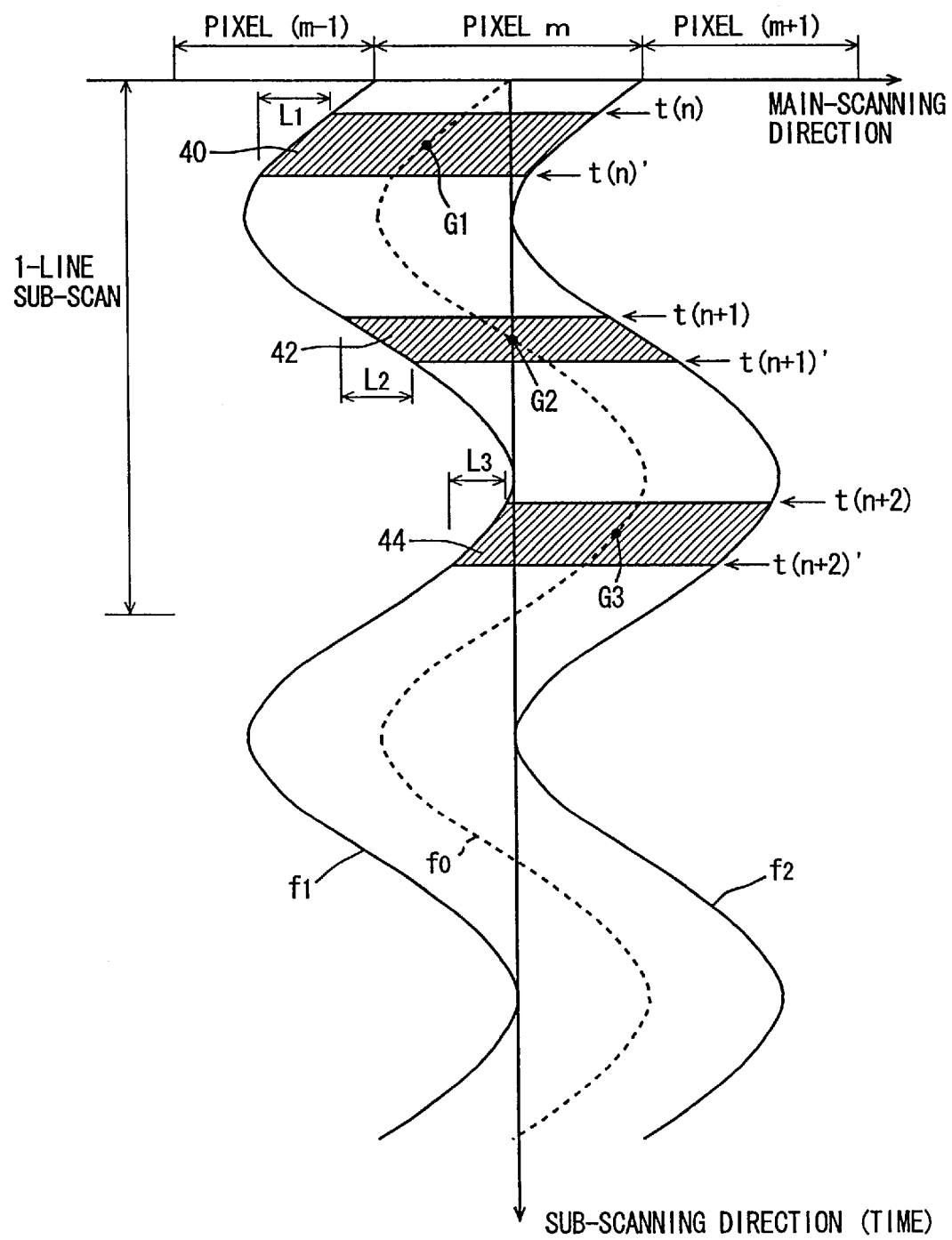
FIG. 4 represents a time period of charge accumulation and a time point to start charge accumulation when a CCD linear sensor oscillates to scan an original.

The control will now be described more specifically. Referring to FIG. 4, the horizontal axis corresponds to the main-scanning direction and the vertical axis corresponds to the sub-scanning direction and the origin corresponds to the center of the mth pixel (referred to as a "pixel m" hereinafter) of CCD linear sensor 11. It should be noted that the sub-scanning direction can also be represented as time axis. The center of pixel m scans an original, providing a locus corresponding to an oscillation function $f_0$ indicated by the dotted line in the figure. Opposite ends of pixel m scan the original, providing loci respectively representing functions $f_1$ and $f_2$ indicated by the solid lines in the figure. One line is sub-scanned in one period of each of functions $f_0$, $f_1$, $f_2$. In FIG. 4, a divider value N of three is used. It should be noted that divider value N represents the charge accumulation frequency in one oscillation period of CCD linear sensor 11 in accordance with an oscillation function.

Referring to the figure, in CCD linear sensor 11 the first charge accumulation is provided during the period from $t(n)$ to $t(n)'$. During this period, that portion of an original which corresponds to a hatched area 40 in the figure is scanned. More specifically, area 40 is one portion of the original that is projected on CCD linear sensor 11 when CCD linear sensor 11 is moved during the period $t(n)$ to $t(n)'$. The second charge accumulation is provided during the period from t(n+1) to t(n+1)'. During this period, that portion of the original which corresponds to an area 42 in the figure is scanned. The third charge accumulation is provided during the period from t(n+2) to t(n+2)'. During this period, that portion of the original which corresponds to an area 44 in the figure is scanned. Image signals obtained by scanning areas 40, 42, 44, respectively, are synthesized in signal synthesizing circuit 23 and output as an image signal for one line. Thus, areas 40, 42, 44 are synthesized at a single location or line in the sub-scanning direction of the original. As such, aligning areas 40, 42, 44 in the main-scanning direction at equal intervals can correspond to tripling the number of pixels of CCD linear sensor 11. Thus, the time period of each charge accumulation and the time point to start each charge accumulation may be determined to equalize the distances between barycenters $G_1$, $G_2$, $G_3$ of areas 40, 42, 44, respectively, or inter-center distances in the main-scanning direction, i.e., to align barycenters $G_1$, $G_2$, $G_3$ at equal intervals in the main-scanning direction.

In a pixel's locus with the oscillating CCD linear sensor, the pixel oscillates in the main-scanning direction and accumulates electric charge multiple times for one period. Thus, there are obtained multiple centers on the locus (or of projected portions) of the pixel during charge accumulation. The time period for each charge accumulation and the time point to start each charge accumulation may be determined to equalize the distances between the multiple, obtained centers (the inter-center distances).

Figure 5:
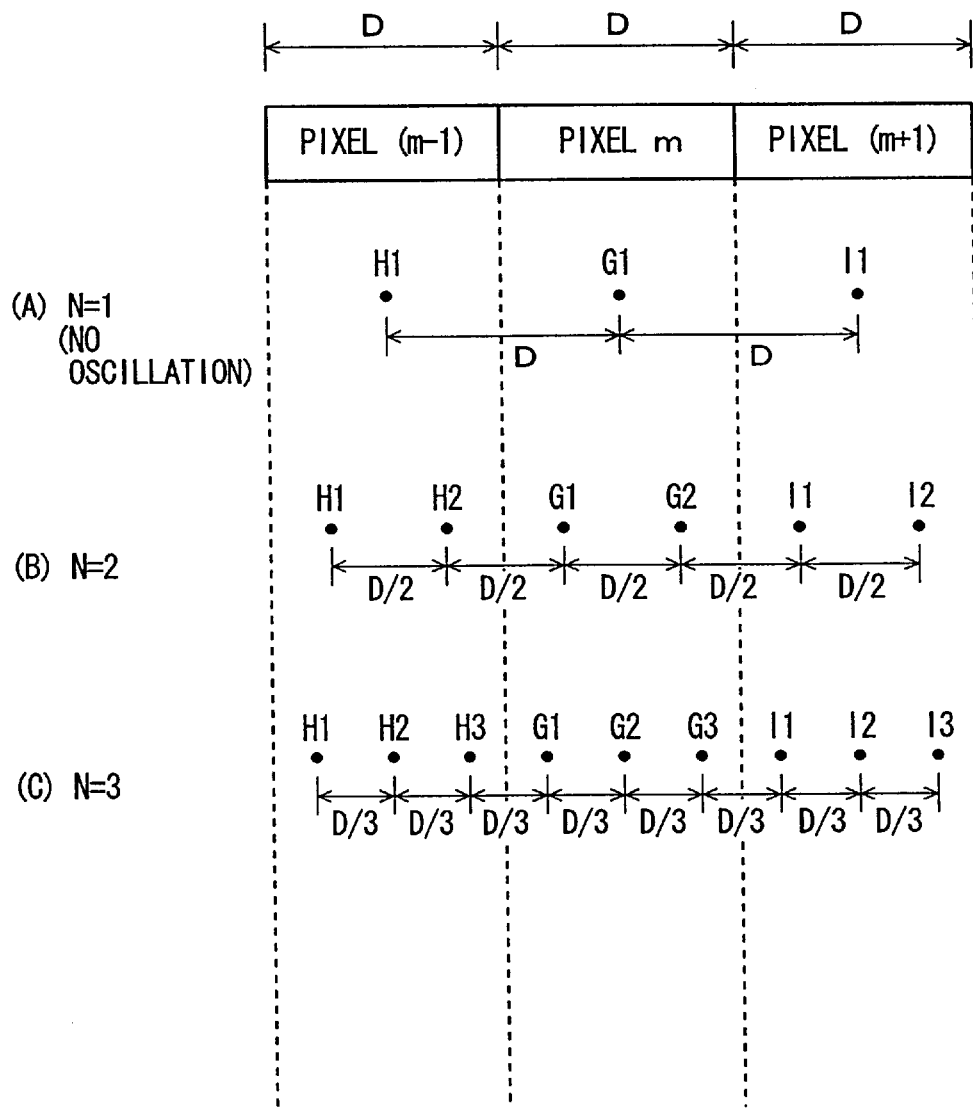
FIG. 5 shows arrangements of barycenters of areas of an original that are scanned by pixels for one oscillation period of a CCD linear sensor in accordance with an oscillation function.

The above operation will now be described more specifically. Referring to FIG. 5, FIG. 5 (A) represents a positional relationship between barycenters for a divider value N of one, i.e., when CCD linear sensor 11 does not oscillate. Pixel m and pixels (m−1) and (m+1) adjacent thereto are arranged with a pixel width D. G1, H1, I1 denote the barycenters of pixels m, (m−1), (m+1), respectively. D denotes the distance between barycenters H1 and G1 in the main scanning direction (the inter-center distance therebetween) and the distance between barycenters G1 and I1 in the main scanning direction (the inter-center distance therebetween).

FIG. 5(B) represents a positional relationship between barycenters for a divider value N of two. G1 represents the barycenter of that area of an original which is scanned by pixel m while pixel m oscillates and performs the first charge accumulation, and G2 represents the barycenter of that area of the original which is scanned by pixel m while pixel m oscillates and performs the second charge accumulation. Similarly, H1 and H2 represent the barycenters of those regions of the original which are scanned by pixel (m−1) while the pixel performs its first and second charge accumulation operations, respectively. I1 and I2 similarly represent the barycenters of those areas of the original that are scanned by pixel (m+1) while the pixel performs its first and second charge accumulation operations. The barycenters are aligned at equal intervals of D/2.

FIG. 5(C) represents a positional relationship between barycenters in the main scanning direction for a divider value N of three. As with the divider value N of two, G1, H1, I1 each represent the position of a barycenter at the first charge accumulation, G2, H2, I2 at the second charge accumulation, and G3, H3, I3 at the third charge accumulation. As shown in the figure, the barycenters are aligned at equal intervals of D/3.

To align the barycenters of areas of an original that are scanned by a pixel during the pixel's charge accumulation in the main-scanning direction at equal intervals, the time period for which the pixel performs each charge accumulation and the time point at which the pixel starts each charge accumulation can be determined according to the following expression:

$$A\left|f\left(\frac{t(n)+t(n)'}{2}\right)-f\left(\frac{t(n+1)+t(n+1)'}{2}\right)\right|=\frac{D}{N} \quad (1)$$

wherein n: nth charge accumulation;

A: amplitude;

f(t): normalized oscillation function;

t(n): time point to start the nth charge accumulation;

t(n)': time point to end the nth charge accumulation;

T: pixel width; and

N: divider value.

A technique will now be described of equalizing blur levels caused by the oscillation of a pixel, without depending on the timing of charge accumulation. Referring to FIG. 4, $L_1$ represents the movement of pixel m in the main-scanning direction when pixel m scans area 40. Similarly, $L_2$ and $L_3$ represent the movements of pixel m in the main-scanning direction when pixel m scans areas 42 and 44, respectively. To equalize blur levels, the time for the pixel to perform each charge accumulation may be determined to equalize movements $L_1$, $L_2$, $L_3$.

The charge accumulation time can be determined according to the following equation:

$$|f(t(n))-f(t(n)')|=|f(t(n+1))-f(t(n+1)')| \quad (2)$$

wherein n: nth charge accumulation;

f(t): normalized oscillation function;

t(n): time point to start the nth charge accumulation; and t(n)': time point to end the nth charge accumulation.

Thus, the time point to start each charge accumulation is determined to equalize the intervals between the barycenters of those areas of an original which are scanned by a pixel while the pixel performs charge accumulation, and the time period of each charge accumulation is determined to equalize blur levels caused by the oscillation of the pixel, without depending on the timing of charge accumulation.

Figure 6:
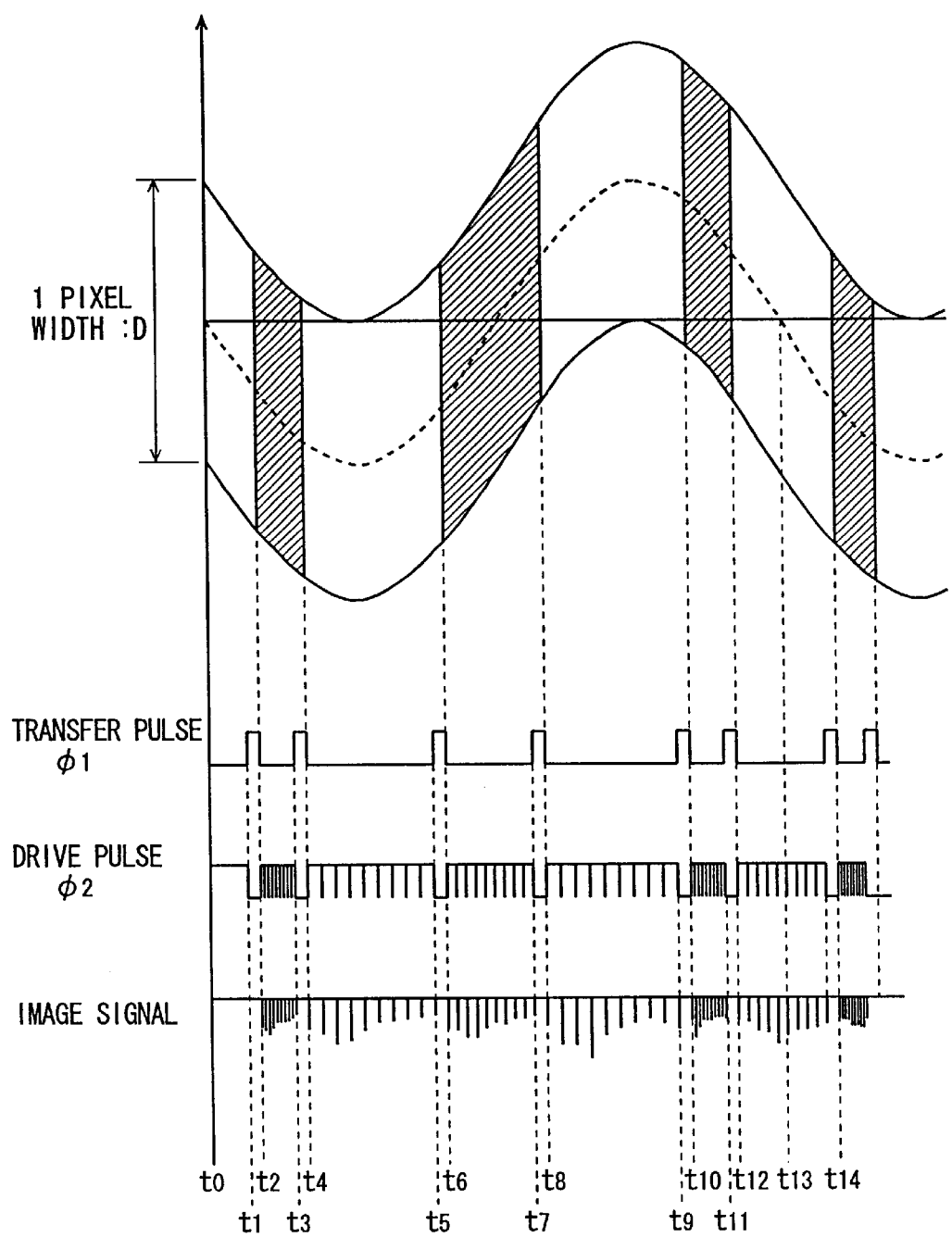
FIG. 6 represents a relationship between a signal output from a sensor drive circuit and an image signal output from a CCD linear sensor for one oscillation period of the CCD linear sensor in accordance with an oscillation function.

Referring to FIG. 6, the CCD linear sensor oscillates with a time period $t_0-t_{13}$ as one period. The first, second and third charge accumulation operations are provided during periods $t_2-t_4$, $t_6-t_8$, and $t_{10}-t_{12}$, respectively. Before the first charge accumulation, transfer pulse_$\Phi 1$ is output during a time period from $t_1-t_2$ and the charge accumulated in photodiode 31 is transferred to shift register 35. More specifically, the charge stored in photodiode 31 during a time period up to $t_2$ is transferred to shift register 35 and photodiode 31 is reset. During time period $t_2-t_3$, drive pulse_$\Phi_2$ equal in number to shift register 35 is output, during which an image signal is output from shift register 35. The image signal is an unnecessary signal and is thus not processed by signal processing circuit 19. Then, transfer pulse_$\Phi_1$ is output during period t3–$t_4$ to transfer to shift register 35 the charge accumulated in photodiode 31 during period $t_2-t_4$. During period $t_4-t_5$, drive pulse_$\Phi_2$ is output and the charge transferred to shift register 35 is output as an image signal to signal processing circuit 19. Thus, when charge accumulation is to be both started and ended in photodiode 31, transfer pulse_$\Phi_1$ is output and the charge accumulated in photodiode 31 is transferred to shift register 35. The transfer pulse_$\Phi_1$ output when charge accumulation is to be started is output to clear the charge accumulated in photodiode 31, and the transfer pulses $\Phi_1$ output when charge accumulation is to be ended is output to process accumulated charge as an image signal.

Drive pulse $\Phi_2$ is a pulse for outputting as an image signal the charge transferred to shift register 35. Even when unnecessary data is transferred, drive pulse $\Phi_2$ is also output, e.g., during period $t_2$–$t_3$, since the data must be output from shift register 35.

The charge accumulated in photodiode 31 during period $t_6$–$t_8$ corresponding to the second charge accumulation is transferred to shift register 35 in response to transfer pulse $\Phi_1$ output during period $t_7$–$t_8$, and it is output from shift register 35 as an image signal in response to drive pulse $\Phi_2$ output during period $t_8$–$t_9$. Similarly, the charge accumulated during period $t_{10}$–$t_{12}$ corresponding to the third charge accumulation is transferred to shift register 35 in response to transfer pulse $\Phi_1$ output during period $t_{11}$–$t_{12}$, and it is output from shift register 35 as an image signal successively during period $t_{12}$–$t_{14}$.

Figure 7A:
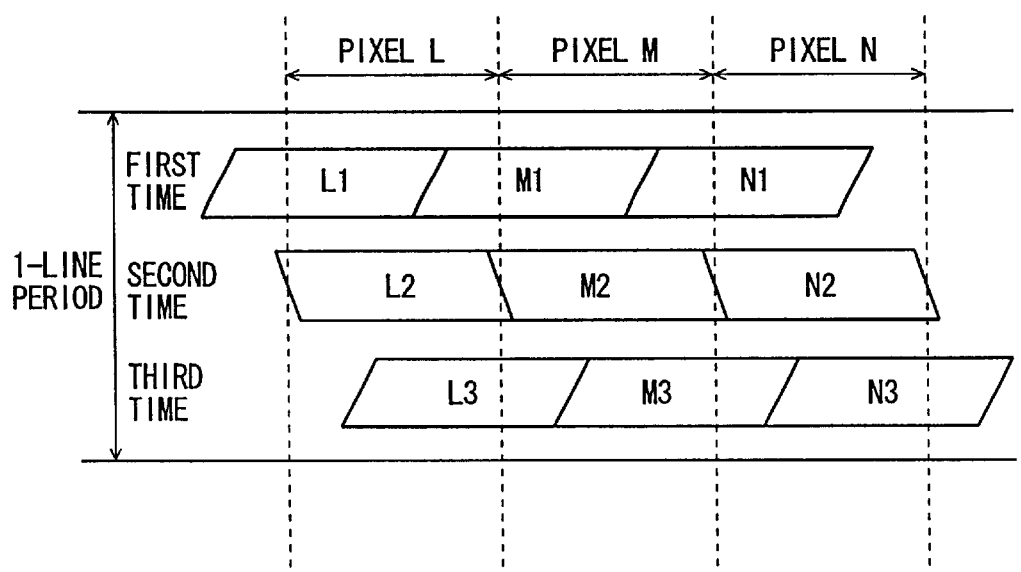
FIG. 7A schematically shows a locus of a pixel scanning an original for one oscillation period of a CCD linear sensor in accordance with an oscillation function.

Referring to FIG. 7A, pixels L, M, N each perform charge accumulation three times for one oscillation period. L1, M1 and N1 denote those areas of an original which are scanned by pixels L, M and N when the pixels each perform the first charge accumulation. L2, M2 and N2 denote those areas of the original which are scanned by the pixels when the pixels each perform the second charge accumulation. L3, M3 and N3, denote those areas of the original which are scanned by the pixels when the pixels perform each the third charge accumulation. Charge accumulation is timed to equalize the intervals between the barycenters of the areas in the main-scanning direction (the lateral direction in the figure) in the order of areas L1, L2 and L3, M1, M2 and M3, or N1, N2 and N3.

Figure 7B:
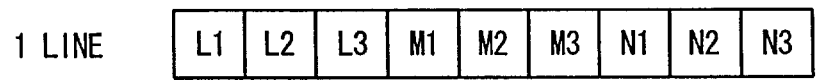
FIG. 7B represents a synthesized image signal obtained through the scan represented in FIG. 7A.

When pixels L, M and N scan areas L1 to L3, M1 to M3, and N1 to N3, respectively, the image signals respectively corresponding to the scanned areas are transmitted from the CCD linear sensor via signal processing circuit 19 and stored in memory 21. Signal synthesizing circuit 23 synthesizes the obtained image signals into an image signal for one line such that the barycenters of the scanned areas are aligned positionally in order. This signal synthesizing process is provided by operating an address counter of memory 21 depending on a divider value N (of three). Referring to FIG. 7B, a pixel count of three is provided when an image is read without oscillating CCD linear sensor 11, whereas when CCD linear sensor 11, is oscillated in reading an image an image signal can be obtained three times for one oscillation period to provide a resolution of nine pixels.

It should be noted that in FIG. 7A there are variations in time period among the first, second and third charge accumulation operations performed by a pixel, since CCD linear sensor 11, oscillating in accordance with a sinusoidal function, varies in its speed in the main-scanning direction with each of the first, second and third charge accumulation operations. In other words, they are attributed to the equalization of the movements of the CCD linear sensor in the main-scanning direction for the first, second and third charge accumulation operations in order to equalize the blur levels resulting from the oscillation of CCD linear sensor 11 in the first, second and third charge accumulation operations performed by CCD linear sensor 11. The time-period variations among the first, second and third charge accumulation operations are subjected to an analog process and thus adjusted in signal processing circuit 19. It should be noted that while for the purpose of simplification the CCD linear sensor in conjunction with FIGS. 7A and 7B has three pixels, it may have any other number of pixels.

Figures 8, 13:
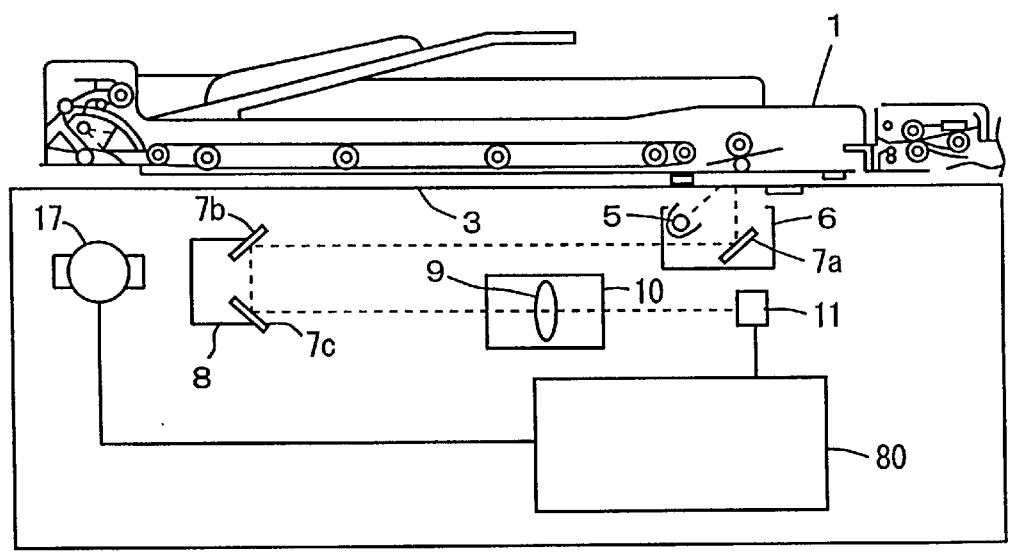
FIG. 8 specifically represents how charge accumulation is timed for one oscillation period of a CCD linear sensor in accordance with an oscillation function.
FIG. 13 is a cross section of a conventional image reading apparatus.

A charge accumulation time in one period ($0 \leq t < 2\pi$) will now be specifically exemplified, with an amplitude A of an oscillation function, and the oscillation function that is normalized, provided as f(t)=sin (t). In FIG. 8 the positions of barycenters are as shown in FIG. 5. According to expressions (1) and (2), amplitude A and a time point to start charge accumulation ts and a time point to end charge accumulation te are obtained, as provided in FIG. 8.

Referring to FIG. 8, for divider value N=2, with amplitude A=D/4 there are provided time ts=0 and time te=$\pi$ for the first charge accumulation and time ts=$\pi$ and time te=$2\pi$ for the second charge accumulation. For the first charge accumulation, the barycenter of that area of an original which is scanned by a pixel corresponds to G1 shown in FIG. 5(B). Similarly, for the second charge accumulation, the barycenter of that area of the original which is scanned by the pixel corresponds to G2 shown in FIG. 5(B).

For divider value N=3, with amplitude A=2 D/3 there are obtained time ts=1/6•$\pi$ and time te=(1/2)•$\pi$ for the first charge accumulation, time ts=0.975$\pi$ and time te=1.025$\pi$ for the second charge accumulation, and time ts=( 3/2)•$\pi$ and time te=(5/3)•$\pi$ for the third charge accumulation. For the first charge accumulation, the barycenter of that area of an original which is scanned by a pixel corresponds to G1 of FIG. 5(C). For the second charge accumulation, it corresponds to G2 of FIG. 5(C). For the third charge accumulation, it corresponds to G3 of FIG. 5(C). Here, the relation tg=(ts+te)/2 is established between a time of barycenter tg and time ts and time te.

Thus, in the image reading apparatus of the present embodiment, CCD linear sensor 11 is oscillated in the main-scanning direction in accordance with a predetermined oscillation function to perform charge accumulation multiple times and output image information during one period of the oscillation function and the image information output during one period are synthesized as the image information for one line. As a result, CCD linear sensors with limited pixel counts can also be used to read original images with high resolutions. Furthermore, since a pixel is moved in the main-scanning direction by the same distance during each charge accumulation performed by the CCD linear sensor to output the image information, the blur levels resulting from the movement of the CCD linear sensor can be equalized and an original can be uniformly read in the main-scanning direction. Furthermore, since the time point for the CCD linear sensor to start each charge accumulation can be determined to equalize in the main-scanning direction the distances between the barycenters of those areas of an original which are scanned by a pixel during the charge accumulation performed by the CCD linear sensor, the areas of the original that are scanned by the CCD linear sensor can be arranged uniformly in the main-scanning direction.

Furthermore, the time period during which each charge accumulation is performed and the time point to start each charge accumulation can be readily determined since the time period for the CCD linear sensor to perform each charge accumulation can be determined according to expression (1) and the time point for the CCD linear sensor to start each charge accumulation can be determined according to expression (2).

While in the present embodiment, sub-scanning control circuit 29 drives drive motor 17 so that movable portion 6 allows sub-scanning at a constant rate, movable portion 6 may be moved in the sub-scanning direction in synchronization with an oscillation function for oscillating CCD linear sensor 11, to uniformly align in the sub-scanning direction those areas of an original which are scanned by the CCD linear sensor.

Description will now be made of variations the configuration of the image reading apparatus of the present embodiment using piezoelectric element 13 to oscillate CCD linear sensor 11 in the main-scanning direction to provide a relative displacement in the main-scanning direction between the light receiving surface of the CCD linear sensor and an object's image formed on the receiving surface of the CCD linear sensor.

First Variation

FIG. 9 shows a variation for displacing in the main-scanning direction an image formed on the light receiving surface of CCD linear sensor 11. In FIG. 9A, lens 9 and CCD linear sensor 11 are arranged such that an optical axis 51 of lens 9 is aligned with the center of CCD linear sensor 11. In this variation lens 9 is oscillated in the main-scanning direction in accordance with a predetermined oscillation function. Referring to FIG. 9B, when lens 9 is moved in the main-scanning direction by x, indicated by reference numeral 9' optical axis 51 of lens 9 is also moved in the main-scanning direction by x. Thus, an image formed on CCD linear sensor 11 is also moved in the main-scanning direction by x. Thus, by oscillating lens 9 in the main-scanning direction, an image formed on the CCD linear sensor can be oscillated in the main-scanning direction.

Figure 9A:
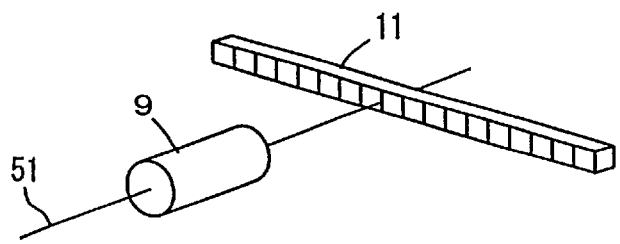
FIGS. 9A–9E, 10A–10C, 11A–11C, and 12A–12C illustrate first to fourth variations of the unit providing a displacement, respectively.
Figure 9B:
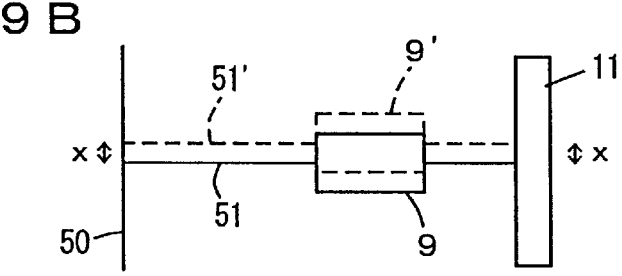
Figure 9C:
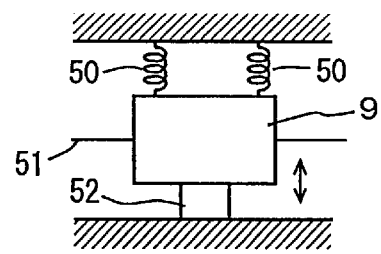

FIG. 9C shows a specific configuration for oscillating lens 9 in the main-scanning direction. Lens 9 is supported by a piezoelectric element 52 for oscillating lens 9 in the main-scanning direction and a spring 50. When piezoelectric element 52 receives a voltage having a predetermined period, piezoelectric element 52 and hence lens 9 oscillate in the main-scanning direction. Spring 50 is provided to supplement the force exerted by piezoelectric element 52 to oscillate lens 9.

Figure 9D:
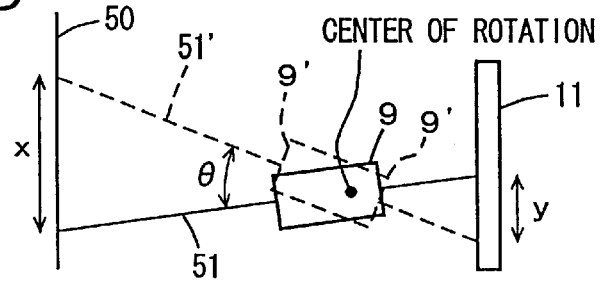

FIG. 9D shows a configuration which rotates lens 9 to oscillate an image formed on CCD linear sensor 11. Lens 9 rotating around its center of rotation varies the position of an image formed on the CCD linear sensor. For example, when lens 9 rotates by θ, to a position indicated by reference numeral 9' optical axis 51 moves to an optical axis 51'. There is a distance x between optical axis 51 and optical axis 51' on an object 50 and the displacement x is represented as a displacement y on the CCD linear sensor. Rotating lens 9 thus allows oscillation of an image formed on the CCD linear sensor.

Figure 9E:
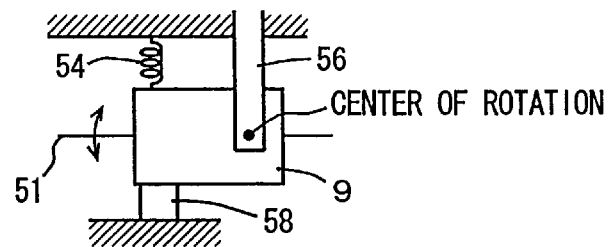

FIG. 9E specifically shows a configuration for rotating lens 9. In the figure, a fixed member 56 supports lens 9 at its center of rotation, and a piezoelectric element 58 also supports lens 9 at a portion distant from its center of rotation in a direction of its optical axis. A spring 54 also supports lens 9 at a side opposite to piezoelectric element 58 along a direction in which piezoelectric element 58 exerts force to lens 9. When piezoelectric element 58 receives a voltage of a predetermined period, lens 9 can reciprocatingly rotates around its center of rotation to oscillate an image formed on the CCD linear sensor.

Second Variation

Figure 10A:
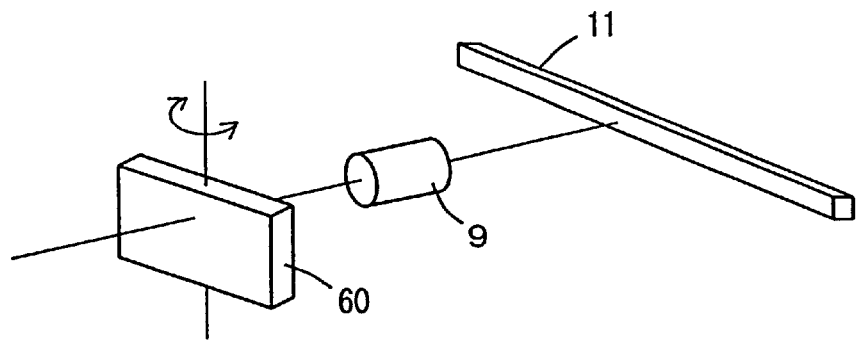

Referring to FIG. 10A, in the second variation a plate glass 60 provided between lens 9 and an object is rotated in the direction indicated by the arrow in the figure.

Figure 10B:
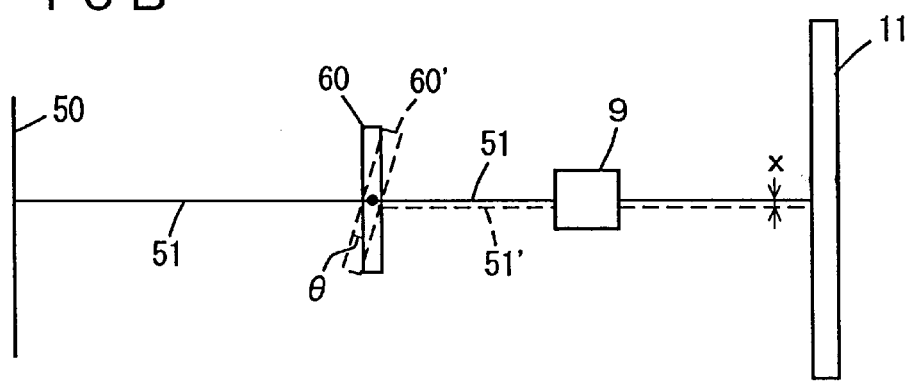

Referring to FIG. 10B, when plate glass 60 is rotated by θ, to a position indicated by reference numeral 60', optical axis 51 moves to optical axis 51' and on CCD linear sensor 11 the image of the object moves by a distance x. Thus, rotating plate glass 60 allows oscillation of an image formed on the CCD linear sensor 11.

Figure 10C:
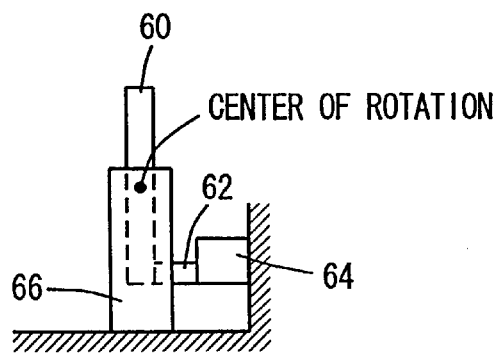

FIG. 10C shows a specific configuration for oscillating plate glass 60. In the figure, plate glass 60 has its center of rotations supported by a fixed 66. Plate glass 60 is connected to an extension member 62 and has the other end connected to a piezoelectric element 64. By applying a voltage with a predetermined period to piezoelectric element 64, plate glass 60 can be reciprocatingly rotated around its center of rotation in accordance with a predetermined period.

Third Variation

Figure 11A:
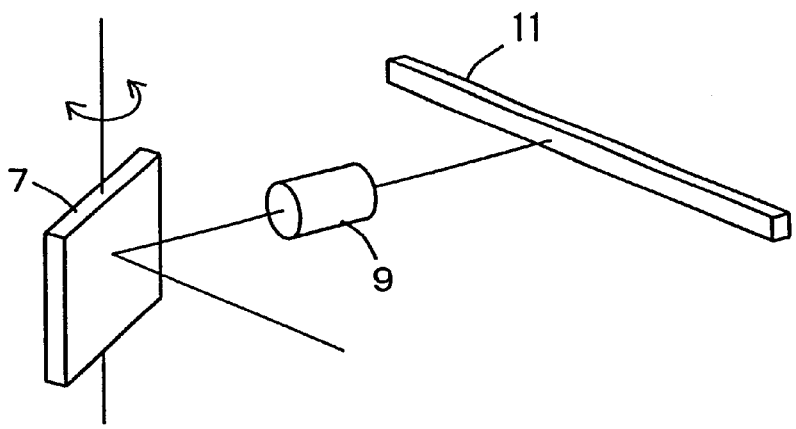

Referring to FIG. 11A, in the third variation a mirror 7 provided between lens 9 and an object is rotated to oscillate an image formed on the CCD linear sensor.

Figure 11B:
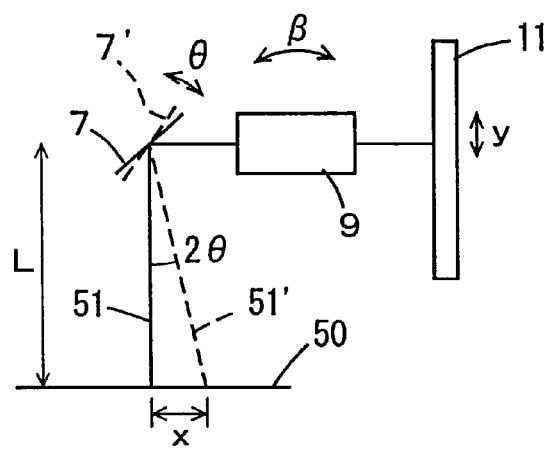

Referring to FIG. 11B, with mirror 7 and an object 50 spaced by a distance L, when mirror 7 is rotated by θ, optical axis 51 moves to optical axis 51'. Optical axes 51 and 51' form an angle of 2θ therebetween. The movement of the optical axis results in the optical axis moving on object 50 by x. A displacement y of an image on CCD linear sensor 11 that is caused by rotating mirror 7 by θ can be represented as y=2θ·L·β, wherein β represents the magnification of lens 9. Thus, slightly, reciprocatingly rotating mirror 7 allows oscillation of an image formed on CCD linear sensor 11.

Figure 11C:
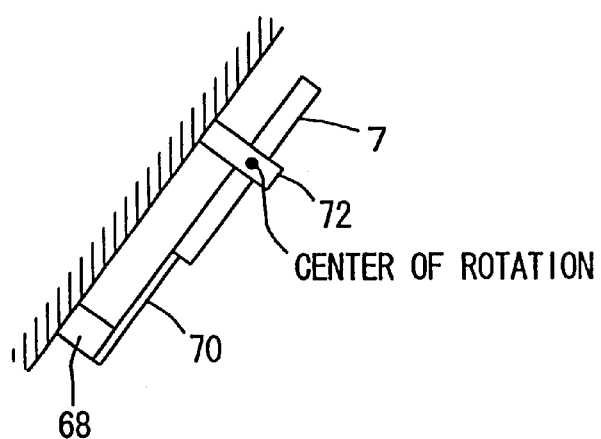

FIG. 11C shows a specific configuration for slightly, reciprocatingly rotating mirror 7. This configuration will not be described since it is the same configuration as described with reference to FIG. 10C, rotating a plate glass, wherein a piezoelectric element 68, an extension member 70, and a fixed 72 of fIG. 11C represents the piezoelectric element 64, the extension member 62, and the fixed 66 of FIG. 10C, respectively.

Fourth Variation

Figure 12A:
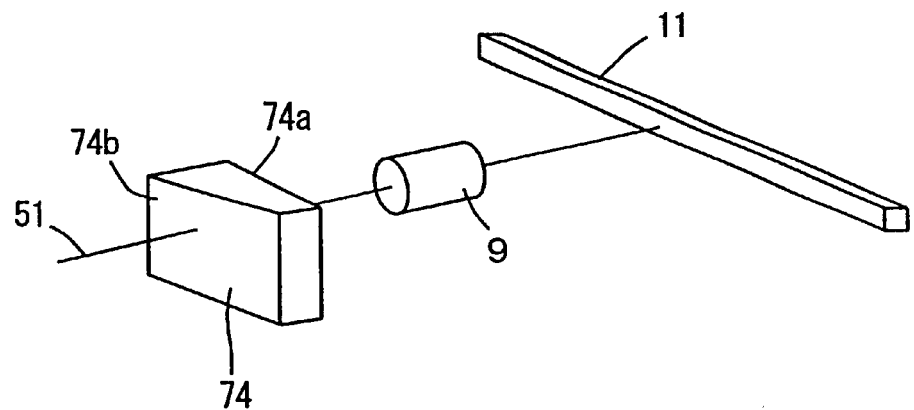

Referring to FIG. 12A, in the fourth variation a prism with a variable apical angle 74 provided between lens and an object has the apical angle changed to oscillate an image formed on CCD linear sensor 11.

Figure 12B:
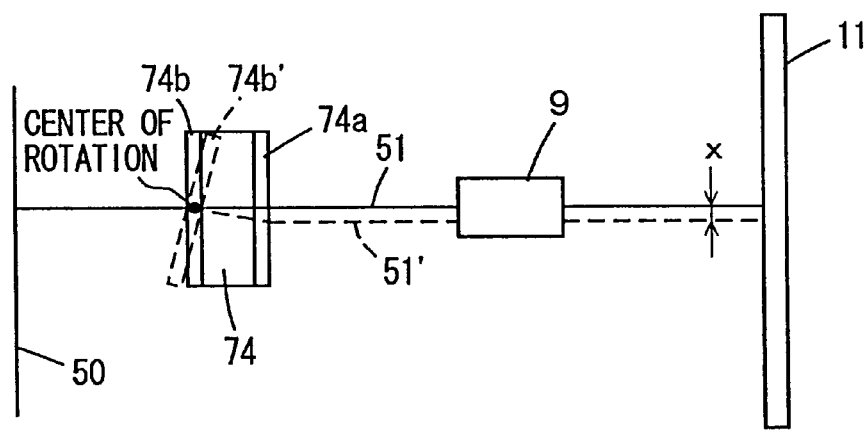

Referring to FIG. 12B, prism with a variable apical angle 74 has a rear side 74a and a front side 74b rotating around its center of rotation. When front side 74b rotates, optical axis 51 can be moved to optical axis 51' to thus move the optical axis on CCD linear sensor 11 by x. Thus, varying an apical angle of prism 74 allows oscillation of an image formed on CCD linear sensor 11.

Figure 12C:
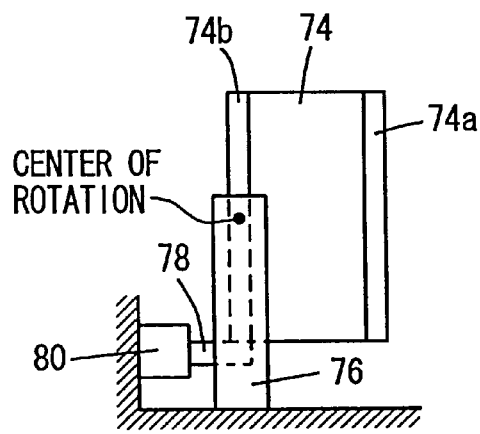

FIG. 12C shows a specific configuration for varying an apical angle of prism 74. In the figure, prism 74 has rear side 74a fixed so that it can not be rotatably moved. Front side 74b has its center of rotation supported by a fixed member 76 and is also connected to a piezoelectric element 80 via an extension member 70. By applying a voltage with a predetermined frequency to piezoelectric element 80, front side 74b can be slightly, reciprocatingly rotated.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image reading apparatus comprising:

a photoelectric conversion unit having photoelectric conversion elements arranged in a main-scanning direction for receiving a light reflected from an original;

means for providing a relative displacement in said main-scanning direction between a light receiving surface of said photoelectric conversion unit and an image of the original formed on said light receiving surface; and control means disposed to time charge accumulation performed in said photoelectric conversion unit; wherein said means for providing a relative displacement provides said relative displacement in accordance with a predetermined oscillation function, and said control means uses a distance from a center of an amplitude of said relative displacement to said photoelectric conversion unit and a time period of charge accumulation by said photoelectric conversion unit to determine a time point to start charge accumulation.

2. The image reading apparatus of claim 1, wherein said photoelectric conversion unit moves in said main-scanning direction by a constant distance during each said time period of charge accumulation; and a movement of said photoelectric conversion unit provides projections having respective centers each distant from an adjacent center by D/N, wherein D represents a width of said photoelectric conversion element in said main-scanning direction and N represents a divider value.

3. The image reading apparatus of claim 1, further comprising a signal synthesizing circuit synthesizing image signals output from said photoelectric conversion unit into a line signal, wherein:

said control means allows a plurality of time periods of charge accumulation in said photoelectric conversion unit in one period of said oscillation function;

said photoelectric conversion unit outputs said image signal for each completion of charge accumulation; and said signal synthesizing circuit synthesizes said image signals output during one period of said oscillation function into said line signal for one line.

4. The image reading apparatus of claim 1, wherein said predetermined oscillation function is a sinusoidal function.

5. An image reading method, focusing a light directed from an original onto a light receiving surface of a photoelectric conversion unit having a plurality of photoelectric conversion elements arranged in a first direction, and moving said formed image and said light receiving surface relative to each other in a second direction crossing said first direction while reading an image on said original, said method comprising the steps of:

providing a relative positional displacement in said first direction between said photoelectric conversion unit and an image formed by an optical system on said light receiving surface of said photoelectric conversion unit; and allowing said photoelectric conversion unit to perform charge accumulation at a position resulting from said displacement, and outputting an image signal.

6. The image reading method of claim 5, wherein said step of providing provides said relative positional displacement in accordance with a predetermined oscillation function.

7. The image reading method of claim 6, wherein said step of allowing uses a distance from a center of an amplitude of said relative positional displacement to said photoelectric conversion unit and a time period of charge accumulation by said photoelectric conversion unit to determine a time point for said photoelectric conversion unit to start charge accumulation.

8. The image reading method of claim 7, wherein:

said photoelectric conversion unit moves in said first direction by a relative, constant distance during each said time period of charge accumulation; and a movement of said photoelectric conversion unit provides projections having respective centers each distant from an adjacent center by D/N, wherein D represents a width of said photoelectric conversion element in said first direction and N represents a divider value.

9. The image reading method of claim 7, further comprising the step of synthesizing image signals output from said photoelectric conversion unit into a line signal, wherein:

a plurality of time periods of charge accumulation in said photoelectric conversion unit are provided in one period of said oscillation function;

said photoelectric conversion unit outputs an image signal for each completion of charge accumulation; and the step of synthesizing synthesizes said image signals output during one period of said oscillation function into said line signal of one line.

10. The image reading method of claim 6, wherein said predetermined oscillation function is a sinusoidal function.

* * * * *

UNITED STATES PATENT AND TRADEMARK OFFICE
CERTIFICATE OF CORRECTION

PATENT NO.    : 6,697,175 B1
DATED         : February 24, 2004
INVENTOR(S)   : Makoto Kumagai et al.

It is certified that error appears in the above-identified patent and that said Letters Patent is hereby corrected as shown below:

Column 1,
Lines 40 and 51, delete "dive", and insert -- drive --.

Column 4,
Lines 21 and 25, delete "pulse__$\Phi_1$", and insert --pulse $\Phi_1$--.

Lines 22 and 42, delete "dive", and insert -- drive --.
Lines 23 and 27, delete "pulse__$\Phi_2$", and insert --pulse $\Phi_2$--.

Column 6,
Lines 49, 58, 65 and 67, delete "pulse__$\Phi_1$", and insert --pulse $\Phi_1$--.
Lines 54 and 61, delete "pulse__$\Phi_2$", and insert --pulse $\Phi_2$--.

Column 7,
Line 2, delete "pulse__$\Phi_1$", and insert --pulse $\Phi_1$--.
Line 46, after "11", insert -- , --.

Column 8,
Line 1, delete "(0) □ $\leq$ t < 2 $\pi$)", and insert --(0) $\leq$ t < 2 $\pi$)--.

Column 9,
Lines 18 and 19, delete "by x, indicated by reference numeral 9'optical", and insert -- by x (indicated by reference numeral 9'), optical --.
Line 38, delete "θto", and insert -- θ to --.
Line 39, after "numeral 9'", insert -- , --.
Line 61, after "θ", delete ",".

UNITED STATES PATENT AND TRADEMARK OFFICE
CERTIFICATE OF CORRECTION

PATENT NO.    : 6,697,175 B1
DATED         : February 24, 2004
INVENTOR(S)   : Makoto Kumagai et al.

It is certified that error appears in the above-identified patent and that said Letters Patent is hereby corrected as shown below:

Column 10,
Line 13, delete "2θtherebetween", and insert -- 2θ therebetween --.
Line 25, delete "fIG.", and insert -- FIG. --.

Signed and Sealed this

Thirtieth Day of November, 2004

JON W. DUDAS
*Director of the United States Patent and Trademark Office*